Feb. 22, 1966

T. O. SUMMERS 3,237,190

ANALOG-TO-DIGITAL VOLTAGE CONVERTER

Filed March 20, 1963

Thomas O. Summers
INVENTOR.

BY Clarence A. O'Brien and Harvey B. Jacobson
Attorneys

United States Patent Office 3,237,190

Patented Feb. 22, 1966

3,237,190

ANALOG-TO-DIGITAL VOLTAGE CONVERTER

Thomas O. Summers, Albuquerque, N. Mex., assignor of one-half to McAllister & Associates, Inc., Albuquerque, N. Mex., a corporation of New Mexico Filed Mar. 20, 1963, Ser. No. 266,721
8 Claims. (Cl. 340—347)

This invention relates to an electronic type of analog-to-digital voltage converter and more particularly to a conversion network by means of which an unknown analog quantity may be converted into an accumulated count representing a digital equivalent by means of which the unknown analog quantity may be measured.

It is therefore a primary object of the present invention to provide an electronic conversion network particularly suited for multiplex operations in computers and in digital data acquisition systems.

Another object of the present invention is to provide a conversion network that isolates the analog signal source from sources of electrical noise or transient pulses within the conversion network so that the converter can be used in conjunction with noise sensitive signal sources.

Another object of the present invention is to provide a converter that has a precisely known and/or selectable time relationship between the input voltage and the digital output.

Another object of the present invention is to provide a conversion network for an analog-to-digital converter whereby measurements may be made by decomposing an input voltage representing the magnitude of an unknown quantity, producing a digital number output corresponding to the input voltage that was present at the time the conversion command signal is received. The conversion network may therefore be suitably designed and controlled for measurement of D.C. voltages, short samples of a varying input voltage, transient peak voltages, etc.

A further object of the present invention is to provide a conversion network for an analog-to-digital converter which does not rely upon operation at a fixed frequency nor any precise frequency control elements, whereby the network may withstand unusually high shock and vibration environments.

An additional object of the present invention is to provide an analog-to-digital converter of the electronic type wherein decomposition of an input voltage produces a wave form characterized by very strong harmonics of the basic repetition rate so as to readily excite any number of zero potential detecting circuits such as a blocking oscillator, simplifying both operation and construction of the conversion network.

In accordance with the foregoing objects, the conversion network of the present invention utilizes a novel method for measuring the input voltage representing the unknown analog quantity. The input voltage to be measured is therefore stored within a storage capacitor after which the capacitor is disconnected from the voltage input. While the storage capacitor is disconnected, the charge stored therein is removed periodically by equal increments until the remaining charge is substantially reduced to zero at which time a detecting circuit stops the conversion process. As the charge within the storage capacitor is being removed by equal increments, the number of increments so removed are counted so that when the conversion process is stopped, the accumulated count will constitute the digital number equivalent to the input voltage to which the storage capacitor is charged at the instant the conversion command signal is received. From the accumulated count, the quantity represented by the input voltage may be calculated in accordance with the following formula:

$$Vin=\frac{N(\Delta Q)+\delta}{C}$$

where $Vin$=analog input voltage, $N$=digital number output, $\Delta Q$=charge increment, $\delta$=charge residue, less than $\Delta Q$, and $C$=capacitance of the storage capacitor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
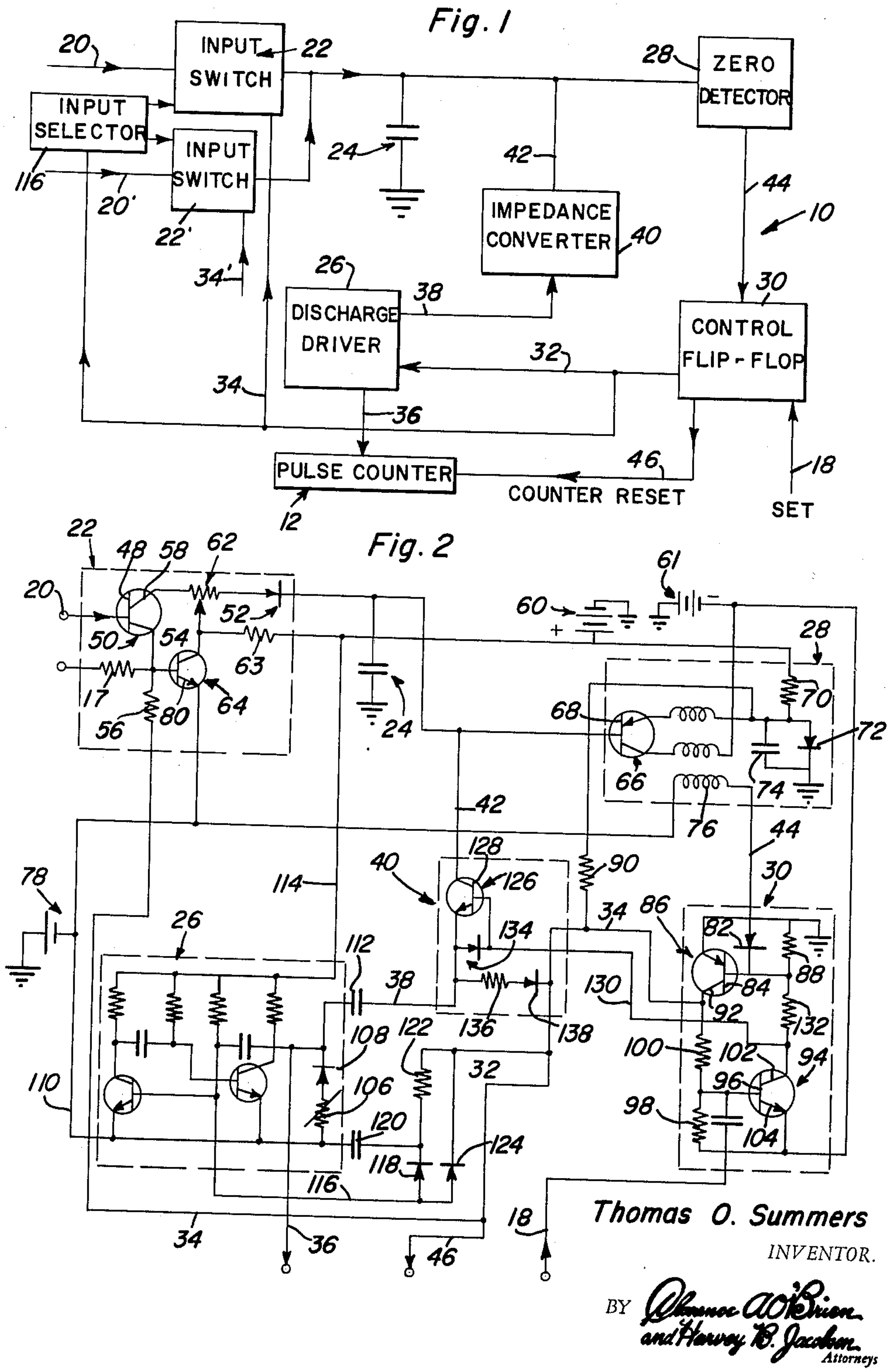
FIGURE 1 is a block diagram illustrating the underlying principles of the present invention.
FIGURE 2 is an electrical circuit diagram illustrating one exemplary form of conversion network that may be utilized in accordance with the principles of the present invention.

Referring now to the drawings in particular, FIGURE 1 illustrates diagrammatically the conversion network generally referred to by reference numeral 10 which may form part of an analog-to-digital converter assembly to which a power supply is connected and to which a series of binary counter stages constituting a pulse counter 12 may be connected for receiving the output therefrom. The input to the conversion network 10 may be derived from several input feed lines 20 operative on the conversion network through a suitable parallel switch control assembly 16 for multiplex operation. An instantaneous input voltage thus supplied to the conversion network representing the unknown analog quantity, may be sampled upon receipt of a conversion command signal through line 18. The digital output will therefore be furnished by the pulse counter 12 upon completion of the conversion process beginning with receipt of the command signal at which instant the input voltage to be measured exists at the input line 20.

The input line is therefore connected to the conversion network 10 by means of an input switch component 22 which when open will disconnect the input variable voltage source from a grounded storage capacitor 24 which is operatively coupled to the input switch component. Closing of the input switch thus starts the conversion process. With the input switch closed, the discharge driver component 26 will be in a quiescent state so that a voltage above zero stored in the storage capacitor 24, causes the zero detector component 28, operatively coupled to the capacitor, to be passive. In this passive state, the zero detector operatively connected to the control flip-flop circuit 30, has conditioned the flip-flop circuit to prevent operation of the discharge driver 26 by virtue of its operative conection thereto by the signal line 32. Upon receipt of the conversion command signal through line 18, the flip-flop circuit is set to one of its conditions so as to dispatch a signal through signal line 34 to the input switch causing it to disconnect the input 20 from the storage capacitor and through line 32, causing the discharge driver to begin generating periodic current pulses dispatched by the output line 36 to the pulse counter 12 and through line 38 to the impedance converter 40. The impedance converter offers a low impedance path to pulses transmitted thereto through line 38 so as to pass capacitor discharging pulses to the capacitor 24 through line 42. The impedance converter therefore presents a high impedance path to the discharge capacitor causing discharge therefrom of small but equal increments of charge without influencing the amplitude of the current pulses passed therethrough so as to maintain discharge of the capacitor by the equal increments. When the charge stored in the capacitor is substantially zero or less than the amount of the constant increment it is being reduced by the zero detector 28 dispatches an output pulse through line 44 to the flip-flop control circuit causing it to be reset. A reset signal which resets the counter 12 to zero is dispatched through the line 46 from the flip-flop circuit when it is set by the conversion command signal. Counter reset thus occurs during a time delay between opening of the input switch 22 and discharge of the capacitor 24. Stop signals on the other hand are dispatched through lines 32 and 34 for stopping the discharge driver from generating pulses and closing the input switch so that the input 20 may be connected to the storage capacitor for storing another input voltage to be subsequently measured when another conversion command signal is received. Thus, the conversion cycle is completed at the same time that the conversion network is automatically reset for the next conversion cycle.

Referring now to FIGURE 2, specific examples of the various components forming the conversion network, are shown. It will be appreciated, however, that other equivalent components having comparable operating characteristics for the purposes of the present invention, may be utilized although several advantageous features are embodied in the exemplary circuit arrangement illustrated.

When the input switch 22 is in closed condition, the input voltage signal from input 20 will be applied to the base 48 of transistor 50 so as to pass the voltage signal through diode 52 to the storage capacitor 24. Under these conditions, the transistor 50 is rendered conductive by a negative potential applied to the collector 54 through resistor 56. The negative potential is established by the output of the control flip-flop circuit 30, the output of which is connected by the line 34 to the resistor 56. The emitter 58 is biased by a positive potential from a positive reference potential source 60 connected to the emitter 58 through a zero control resistor 62 and resistor 63. When the flip-flop circuit 30 is set by a conversion command signal, the line 34 is grounded. Grounding of the line 34 is thereby operative to render the transistor 64 heavily conductive to back bias the diode 52 and the transistor 50 in order to open the switch component 22. The storage capacitor 24 will then be disconnected from the input 20 so that the conversion cycle may begin.

The zero detector 28 is a blocking oscillator, which when operative produces an output in the emitter-collector circuit of the transistor 66, the operation however being stopped by a relatively high ratio bias charge maintained on the base 68 of the transistor 66 by virtue of its connection to the storage capacitor 24. The potential source 61 is connected by the resistor 70 to the oscillator in parallel with the capacitor 74 and the diode 72 for supplying energy to the emitter-collector circuit of transistor 66 when operating. The resistor 70 and diode 72 are only for the purpose of achieving temperature compensation of the zero setting. The temperature characteristics of diode 72 will match the temperature characteristics of diode 52, and the emitter-base voltage variations of transistor 66 will track the emitter-base voltage variations of transistor 50. During the generation of a zero detector output pulse, the signal current flows through capacitor 74. When operation of the blocking oscillator begin in response to the reduction in the bias on the base 68 of transistor 66 thereby sensing the substantially zero voltage condition of the capacitor 24, an output is induced in the coil 76 to which negative reference potential source 78 is connected, this negative reference potential source also biasing the emitter 80 of the transistor 64 in the input switch component hereinbefore described. Thus, when the blocking oscillator 28 is rendered operative, an output will appear in line 44 connected to the coil 76 so as to reset the flip-flop circuit 30.

The resetting output pulse from the zero detector 28 is applied through the diode 82 to the base 84 of output transistor 86 otherwise connected by the resistor 88 to ground. The transistor 86 is thereby rendered non-conductive so as to hold the negative potential established on the collector 92 by the negative reference source 61 through resistor 98 and 100. This negative potential is applied through line 34 to the collector of transistor 50 of the input switch component through resistor 56 as hereinbefore indicated. The collector 92 is also connected by the resistor 90 to the zero detector oscillator circuit so that it will be below ground potential to prevent operation of the zero detector if the input voltage applied to the base of the transistor 66 is zero when the capacitor is being charged. Also during the charging of the storage capacitor, a small bias current is drawn from the negative reference source 61 through the impedance converter 40 in a low impedance state and the diode 52 of the input switch to the power supply 60. The bias current is insufficient to render the transistor 94 conductive, a negative bias being applied to the base 96 thereof by virtue of its connection through the resistor 98 to the negative reference source 61, which also establishes a negative potential on the collector 92 as hereinbefore mentioned through the resistor 100. Accordingly, the small bias current will cause a small voltage drop across resistors 98 and 100 with the collector 102 of the transistor 94 held biased near ground during the charging of the capacitor 24. When a set conversion command signal is applied through line 18 capacitively coupled to the base 96 of the transistor 94, it is biased to a heavily conductive state so that the collector-emitter circuit of the output transistor 86 is also rendered heavily conductive to connect the ground to the resistor 56 of the input switch component 22 through line 34. The negative potential previously held on the collector 92 of transistor 86 is thereby removed while the collector 102 of transistor 94 will be near the negative potential of source 61.

The discharge driver component 26 is a multivibrator having a calibration resistor 106 connected in series with a Zener diode 108 between the negative reference potential line 110 and the output line 38 of the multivibrator. A metering capacitor 112 capacitively couples the output of the multivibrator to the line 38 to the impedance converter so as to differentiate the square waves generated in order to produce sharp current pulses. The positive reference potential source 60 is connected to the multivibrator by line 114. The multivibrator is triggered into operation by means of the trigger line 116 which is operatively connected to the output signal line 34 from the flip-flop circuit by means of the diode 118 connected thereto through the R-C network including the capacitor 120 and the resistor 122 so as to delay triggering the multivibrator into operation when the signal line 34 is grounded by the flip-flop circuit upon receipt of the conversion command signal as aforementioned. Another diode 124 also connects the line 116 to the output signal line 34 from the flip-flop circuit in order to dispatch a stop signal from the flip-flop circuit to the multivibrator through line 116 without delay when the flip-flop circuit is conditioned by the zero detecting pulse supplied thereto by the line 44 from the zero detector. Accordingly, the discharge driver 26 will be set into operation upon receipt of the conversion command signal only after a predetermined delay allowing the counters to be reset and the zero detector to recover from offset bias caused by the connection of flip-flop output line 34 thereto through the resistor 90.

The impedance converter involves a transistor 126 with a base 128 that is either grounded or biased negatively by its connection through line 130 to the collector 102 of transistor 94 within the flip-flop circuit. Thus, with base 128 negatively biased, the transistor 126 will transmit the output pulses from the discharge driver to the capacitor 24 through line 42 with maximum output impedance at its collector. A diode 134 is connected in the emitter-base circuit of the transistor 126 allowing the metering capacitor 112 to recharge on the second half of each pulse cycle generated by the discharge driver. Also connected in series between the output line 38 of the discharge driver and the signal line 34 from the flip-flop circuit, is a resistor 136 and a diode 138 through which the aforementioned small bias current is conducted during the charging of the capacitor 24, during which time the base 128 of transistor 126 is grounded through line 130 to reduce collector dissipation. However, when the storage capacitor is being discharged during operation of the discharge driver, bias current will be blocked by the diode 138 to the grounded line 34. Thus, if the bias current is made large enough during charging of the capacitor 24, the voltage on capacitor 24 may follow rapid variations of the input voltage and heating in transistor 126 will be minimized despite the establishment of the high output impedance during the discharge period.

From the foregoing description, the operation and utility of the conversion network will be apparent. Summarizing the conversion operation, it may be initially presumed that the flip-flop circuit 30 is in a reset condition causing the input switch component 22 to be closed and the discharge driver to be quiescent. Assuming then that the input voltage is greater than zero, and a voltage greater than zero exists on the capacitor 24, the zero detector 28 will be passive. In this condition, the flip-flop circuit will prevent operation of the discharge driver so that the impedance converter 40 is also passive and is drawing no current from the capacitor 24. When a conversion command signal is received through line 18 by the flip-flop circuit, it will be switched to the set condition causing the input switch component 22 to disconnect the input 20 from the capacitor 24 and causing the discharge driver 26 to begin generating periodic current pulses. Each time a current pulse is dispached to the impedance converter, a voltage or current pulse is also supplied to the counter stages adding one count to the number being accumulated therein. The impedance converter passes the current pulses from the discharge driver to the capacitor 24, each pulse causing the voltage thereon to decrease by a small increment. The impedance converter insures that the changing voltage on the capacitor does not influence the amplitude of the current pulses dispatched from the discharge driver since the method of the present invention requires that the increment of discharge be constant. The discharge driver will continue to generate the current pulses that discharge the capacitor 24 adding counts to the counter until the flip-flop control circuit is reset by a pulse from the zero detector when it senses that the voltage on the capacitor is at or is crossing the zero voltage level. When the flip-flop circuit is thereby reset, the discharge driver is stopped and the input switch is closed so that the capacitor may then be recharged to the input voltage level in preparation for the next conversion cycle. The conversion cycle is then also complete with the accumulated count provided by the counters representing the digital representation of the analog input voltage in accordance with the relationship therebetween as hereinbefore indicated. It will be appreciated from the foregoing, that the conversion process is restricted to an exact time at which the input voltage measurement effectively occurs. An accurate time reference is thereby made available avoiding elaborate sample-and-hold networks heretofore relied upon for such purposes. As long as the amplitude of the increments is maintained constant, the conversion process will proceed properly and does not require any precise frequency control in connection with the charge removing increments so that the conversion network will withstand frequency disturbing shocks and vibrations which is of considerable advantage. Also, since the conversion network is immediately reset for a new conversion cycle upon completion of the previous cycle, the conversion network of the present invention will be ideally suited for multiplex operation through use of a number of input switches connected in parallel whereby several inputs can be successively measured.

The selector 16 as shown in FIGURE 1 will allow only one input switch to function during each conversion cycle so that the analog voltage input in one of the input lines 20 and 20' may be digitized by the conversion. The selector may accordingly include a binary counter and matrix decoder operatively connected to the flip-flop 30 to automatically change the input being sampled. Other signal selector arrangements may also be utilized including shift registers or electromechanical stepping switches in order to control the signal sampling operation. Thus, with respect to each conversion network, the selector will be operative to either saturate transistor 64 or apply a voltage thereto through resistor 17 substantialy equal to the voltage on emitter 80 prior to receipt of the conversion command signal. The input switch associated with the conversion network will thereby be either disabled or permitted to function normally as hereinbefore described. If the selector is of the type to permit more than one input switch to function during a conversion cycle, the digital output of such an arrangement will represent the largest of the input voltages sampled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. Apparatus for establishing a count corresponding to the magnitude of an unknown value expressed by an electrical potential supplied by an input comprising, a storage capacitor connected to the input for sampling the potential thereof, multivibrator means for producing and transmitting a series of pulses of equal amplitude for lowering the sampled potential stored by said capacitor through discharge of incremental charges therefrom, means for producing a start pulse disconnecting the capacitor from the input to sample the potential of the input at any instant, zero charge detecting means for producing a stop pulse in response to depletion of the sampled potential of said capacitor to a value less than one of said incremental charges, impedance converting means connected to said capacitor for transmitting said pulses from said multivibrator means after the capacitor has been disconnected in a condition charged as said sampled potential, a pulse counter, means responsive to said start pulse to enable the multivibrator means to simultaneously feed pulses to the capacitor for discharge thereof and to the pulse counter and means responsive to said stop pulse to disable said multivibrator means whereby the count attained by said counter during discharge from the capacitor will correspond to the sampled potential of the capacitor prior to discharge therefrom.

2. The combination of claim 1, including means for reducing the impedance of the impedance converting means only during the charging of the storage capacitor to follow rapid variations in the potential applied to the capacitor.

3. Apparatus for establishing a count corresponding to the magnitude of an unknown value expressed by an electrical potential supplied by an input comprising, a storage capacitor connected to the input for sampling the potential thereof, multivibrator means for producing and transmitting a series of pulses of equal amplitude for lowering the sampled potential stored by said capacitor through discharge of incremental charges therefrom, means for producing a start pulse disconnecting the capacitor from the input to sample the potential of the input at any instant, zero charge detecting means for producing a stop pulse in response to depletion of the sampled potential of said capacitor to a value less than one of said incremental charges, impedance converting means connected to said capacitor for transmitting said pulses from said multivibrator means after the capacitor has been disconnected in a condition charged at said sampled potential, a pulse counter, means responsive to said start pulse to enable the multivibrator means to simultaneously feed pulses to the capacitor for discharge thereof and to the pulse counter, means responsive to said stop pulse to disable said multivibrator means whereby the count attained by said counter during discharge from the capacitor will correspond to the sampled potential of the capacitor prior to discharge therefrom, means for reducing the impedance of the impedance converting means only during the charging of the storage capacitor to follow rapid variations in the potential applied to the capacitor, said impedance converting means including means presenting a relatively high impedance path to current discharge from the storage capacitor and a relatively low impedance path to current pulses from the multivibrator means, means for differentiating said pulses transmitted from the multivibrator means uninfluenced by the discharge from the capacitor, and means operatively connecting the zero charge detecting means to the start pulse producing means to disable the zero charge detecting means in response to an absence of potential from the input before the start pulse is produced.

4. In an analog-to-digital converter, means for selectively establishing unknown analog input quantities, means responsive to sampling of an unknown input quantity for reducing the sampled quantity by equal increments, means operative only during said reduction in the sampled quantity for counting the number of increments, and conversion terminating means responsive to reduction of said sampled quantity below a predetermined value for stopping the counting means and disabling the quantity reducing means, whereby the accumulated count of the counting means will provide the digital equivalent of the unknown input quantity and the quantity sampling means will be simultaneously reset for receipt of another of said unknown input quantities.

5. In an analog-to-digital converter, means for selectively establishing input analog quantities, means responsive to the establishment of an input quantity for reducing the quantity by equal increments within a conversion interval proportional to said quantity, means operative only during said conversion interval for counting the number of increments, and conversion terminating means responsive to reduction of said input quantity below a predetermined value for stopping the counting means and disabling the quantity reducing means, whereby the accumulated count of the counting means will provide the digital equivalent of the input quantity and the quantity establishing means will be simultaneously reset for receipt of another of said unknown quantities, said quantity establishing means comprising potential storing means, and input switch means operatively connecting said storing means, to a variable source of potential for charging thereof and responsive to a conversion command signal for disconnecting the storing means from the variable source of potential, and conductive means operativley connecting the input switch means to the flip-flop means for increasing the rate of charge of the storing means.

6. In an analog-to-digital converter, a conversion network comprising, input switch means having a current controlling device rendered conductive by a negative potential applied thereto for passing an input voltage and means responsive to removal of said negative potential for rendering the current controlling device non-conductive, a storage capacitor unidirectionally coupled to said current controlling device for storing the input voltage passed therethrough, a blocking oscillator connected to the storage capacitor to produce an output when the voltage in the storage capacitor is below a predetermined level, flip-flop circuit means operatively coupled to the output of said blocking oscillator to establish the negative potential applied to the current controlling device or a grounding circuit for removal thereof upon receipt of a command signal, a multivibrator rendered operative to periodically produce pulses of constant amplitude, delay means operatively coupling the multivibrator to the flip-flop circuit means for disabling the multivibrator after establishment of said negative potential, impedance coupling means operatively connecting said storage capacitor to the multivibrator and the flip-flop circuit means effecting discharge from the capacitor and drawing biasing current for the flip-flop circuit means during charge of the capacitor, pulse differentiating means operatively connected to the multivibrator and the impedance coupling means for effecting said discharge of the capacitor by equal charge increments, and conductive means operatively connecting the flip-flop circuit means to the blocking oscillator for preventing operation thereof by a voltage below said predetermined value when the flip-flop circuit means is in a condition establishing said negative potential prior to receipt of the command signal.

7. Apparatus for encoding an analog quantity into digital form comprising, capacitor means for sampling an intput voltage representative of the analog quantity, means responsive to said sampling of the input voltage for initiating a conversion cycle proportional in duration to said analog quantity, and means operative during said conversion cycle for incrementally reducing the input voltage to obtain a digital resultant in accordance with the expression $$V=\frac{N(\Delta Q)+\delta}{C}$$

where V equals the input voltage at the beginning of the conversion cycle; N equals the digital resultant; $\Delta Q$ equals an incremental amount by which the input voltage is reduced during the conversion cycle; $\delta$ equals the residue of the charge remaining in the capacitor means less than $\Delta Q$ at the end of the conversion cycle; and C equals the capacitance of the capacitor means, the duration of said conversion cycle occupying a precise time relation to the input voltage and the digital resultant.

8. Apparatus for converting analog quantities into digial form comprising, a variable source of potential, a storage capacitor, input switch means connecting said storage capacitor to the variable source of potential for following voltage variations therein, means responsive to a command signal received by the input switch means for disconnecting the storage capacitor from the source of potential to thereby store a charge at an instantaneous sampled voltage of the source of potential representative of an unknown analog quantity, means simultaneously responsive to said command signal for generating pulses, means connecting the storage capacitor to the pulse generating means for incrementally reducing the charge stored therein by equal increments, means responsive to reduction of the charge in the storage capacitor below the value of each of the increments for disabling the pulse generating means to terminate a conversion cycle, reset means responsive to said termination of the conversion cycle for rendering the switch means operative to connect the storage capacitor to the variable source of potential, and means for counting said pulses during the conversion cycle to provide a digital resultant corresponding to the magnitude of the voltage sampled by the storage capacitor when disconnected from the variable source of potential.

References Cited by the Examiner

UNITED STATES PATENTS

| | | | |
|---|---|---|---|
| 2,817,704 | 12/1957 | Huntley | 340—347 |
| 3,098,224 | 7/1963 | Hoffman | 340—347 |

MALCOLM A. MORRISON, *Primary Examiner.*